(12) United States Patent
Sakai

(10) Patent No.: US 11,270,440 B2
(45) Date of Patent: Mar. 8, 2022

(54) VEHICULAR IMAGE SYNTHESIS APPARATUS

(71) Applicant: DENSO CORPORATION, Kariya (JP)

(72) Inventor: Yosuke Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/921,311

(22) Filed: Jul. 6, 2020

(65) Prior Publication Data

US 2020/0334822 A1    Oct. 22, 2020

Related U.S. Application Data

(63) Continuation of application No. PCT/JP2018/045894, filed on Dec. 13, 2018.

(30) Foreign Application Priority Data

Jan. 10, 2018 (JP) .............................. JP2018-001883

(51) Int. Cl.
| | | |
|---|---|---|
| *G06K 9/00* | (2006.01) | |
| *G06T 7/12* | (2017.01) | |
| *G06T 7/136* | (2017.01) | |
| *G06T 7/174* | (2017.01) | |
| *B60W 40/08* | (2012.01) | |

(52) U.S. Cl.
CPC ................ *G06T 7/12* (2017.01); *G06T 7/136* (2017.01); *G06T 7/174* (2017.01); *B60W 40/08* (2013.01); *B60W 2040/0827* (2013.01); *G06T 2207/30201* (2013.01); *G06T 2207/30268* (2013.01)

(58) Field of Classification Search
CPC .......... G06T 7/12; G06T 7/136; G06T 7/174; G06T 2207/30201; G06T 2207/30268; G06T 1/20; G06T 2200/32; G06T 3/4038; B60W 40/08; B60W 2040/0827; G06K 2009/2045; G06K 9/00845
See application file for complete search history.

(56) References Cited

U.S. PATENT DOCUMENTS

| | | | |
|---|---|---|---|
| 10,769,460 B2* | 9/2020 | Matsumura | ........ G06K 9/00288 |
| 2003/0212648 A1 | 11/2003 | Cunningham et al. | |
| 2006/0212437 A1 | 9/2006 | Cunningham et al. | |
| 2010/0179879 A1 | 7/2010 | Cunningham et al. | |
| 2011/0025836 A1 | 2/2011 | Tamaki et al. | |
| 2015/0139499 A1* | 5/2015 | Shimizu | .................... G06T 5/50 382/104 |
| 2017/0150054 A1* | 5/2017 | Kaida | ................ H04N 5/23238 |

FOREIGN PATENT DOCUMENTS

| | | | |
|---|---|---|---|
| JP | 2007069680 A | | 3/2007 |
| JP | 2007072627 A | | 3/2007 |
| JP | 2007234050 A | | 9/2007 |
| JP | 2007234060 A | * | 9/2007 |

(Continued)

*Primary Examiner* — Dhaval V Patel
(74) *Attorney, Agent, or Firm* — Harness, Dickey & Pierce, P.L.C.

(57) ABSTRACT

A vehicular image synthesis apparatus include a plurality of cameras mounted on a vehicle for capturing an image of a driver. The plurality of images captured by the plurality of cameras may be compared to detect a boundary suitable for synthesis. The plurality of images may be synthesized at the boundary.

4 Claims, 11 Drawing Sheets

(56) References Cited

FOREIGN PATENT DOCUMENTS

| | | |
|---|---|---|
| JP | 2007328582 A | 12/2007 |
| JP | 2008199515 A | 8/2008 |
| JP | 2009181211 A | 8/2009 |
| JP | 2010171777 A | 8/2010 |
| JP | 2011186816 A | 9/2011 |
| JP | 4989762 B2 | 8/2012 |
| JP | 2016099759 A | 5/2016 |

* cited by examiner

VEHICULAR IMAGE SYNTHESIS APPARATUS

CROSS REFERENCE TO RELATED APPLICATIONS

The present application is a continuation application of International Patent Application No. PCT/JP2018/045894 filed on Dec. 13, 2018, which designated the U.S. and claims the benefit of priority from Japanese Patent Application No. 2018-001883 filed on Jan. 10, 2018. The entire disclosures of all of the above applications are incorporated herein by reference.

TECHNICAL FIELD

The present disclosure relates to a vehicular image synthesis apparatus.

BACKGROUND

There is a device in which (i) a face image of a driver is captured by a camera while a driver is driving a vehicle, (ii) the driver's state such as dozing or looking aside is detected based on the captured face image, and (iii) an alarm is issued when it is determined that the driver cannot drive safely. Since the driver visually recognizes the meter on the instrument panel of the vehicle during driving, the camera for capturing the driver's face is installed near the meter of the vehicle.

SUMMARY

According to an example of the present disclosure, a vehicular image synthesis apparatus may be provided to include a plurality of cameras mounted on a vehicle for capturing an image of a driver. The plurality of images captured by the plurality of cameras may be compared to detect a boundary suitable for synthesis. The plurality of images may be synthesized at the boundary.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

First Embodiment

Figure 1:
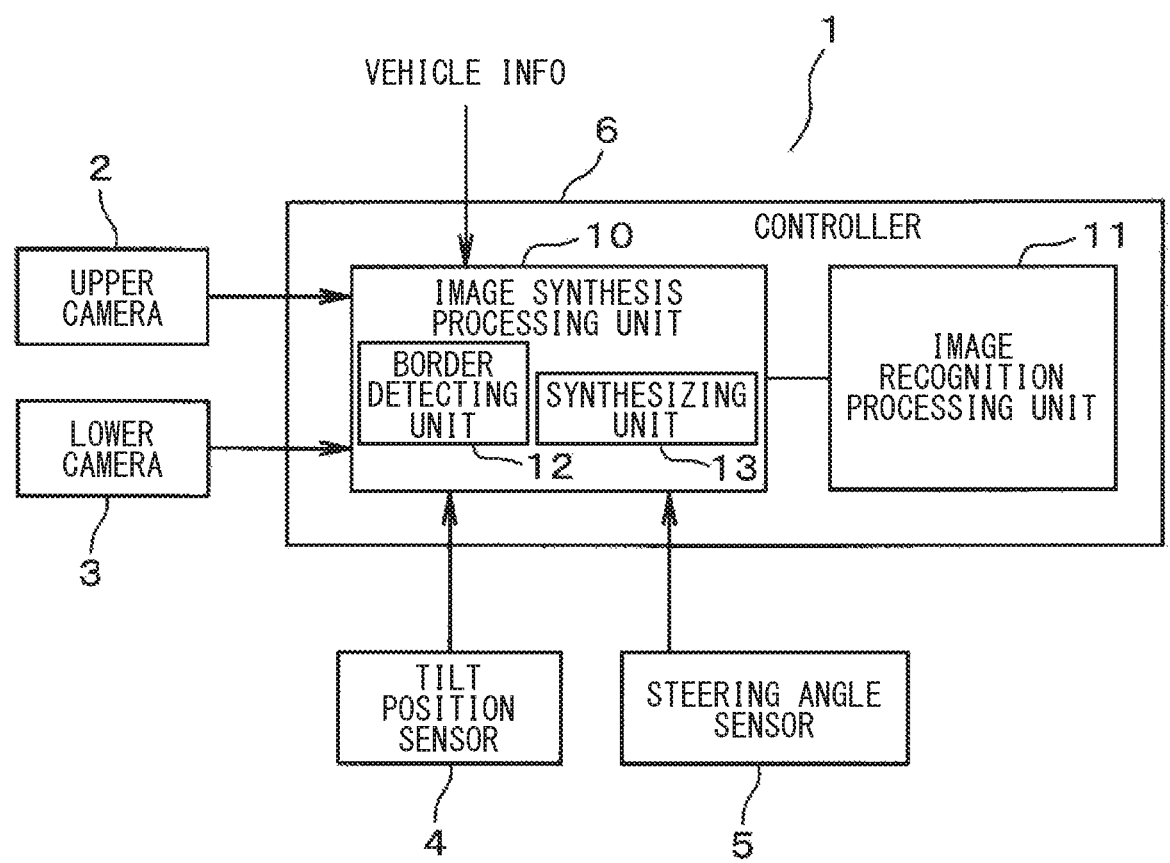
FIG. 1 is a block diagram of a vehicular image synthesis apparatus according to a first embodiment.

Hereinafter, a vehicular image synthesis apparatus according to a first embodiment will be described with reference to FIGS. 1 to 12. FIG. 1 shows an electrical configuration of a vehicular image synthesis apparatus 1. As shown in FIG. 1, the vehicular image synthesis apparatus 1 is configured to include an upper camera 2, a lower camera 3, a tilt position sensor 4, a steering angle sensor 5, and a controller 6.

Figure 2:
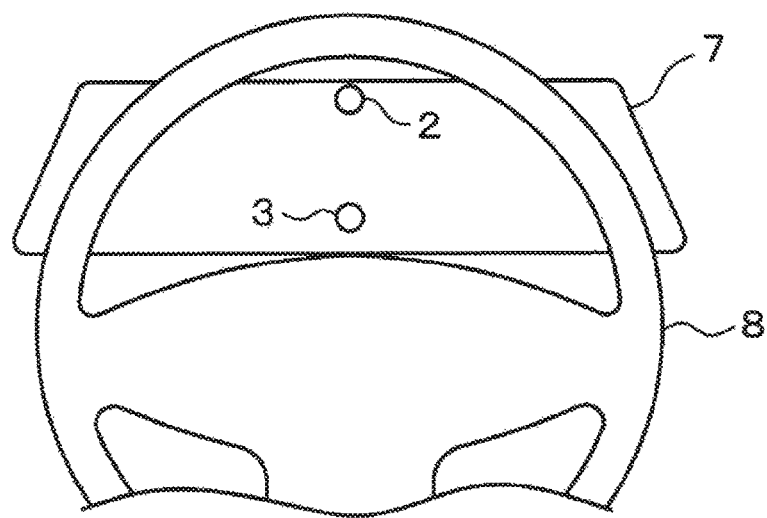
FIG. 2 is a diagram showing a steering wheel, a meter, and a camera.
Figure 3:
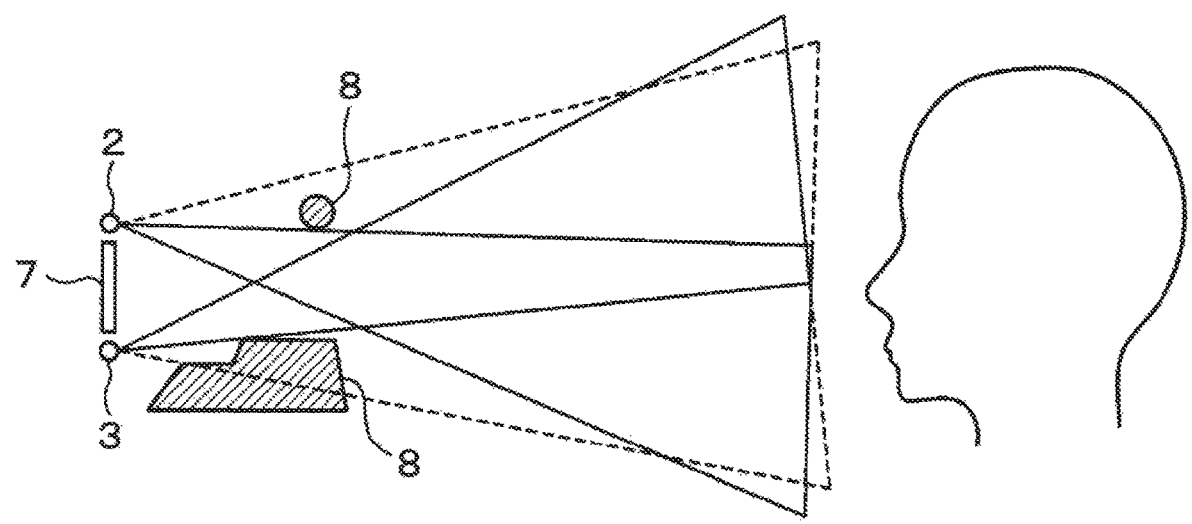
FIG. 3 is a vertical cross-sectional view showing a steering wheel, a meter, a camera, and a driver.

The upper camera 2, which corresponds to a first camera, is arranged at a center position on the upper side of the meter 7 provided on the instrument panel of the vehicle, as shown in FIGS. 2 and 3. The upper camera 2 continuously captures an image of the driver's face and transmits the captured image data to the controller 6. The upper camera 2 includes a function of continuously capturing images at a speed of about 30 frames/s, for example.

The lower camera 3, which corresponds to a second camera, is arranged at a center position on the lower side of the meter 7 provided on the instrument panel of the vehicle, as shown in FIGS. 2 and 3. The upper camera 2 and the lower camera 3 are arranged in the up-and-down direction, that is, in the vertical direction with a preset distance therebetween. The upper camera 2 and the lower camera 3 are arranged so as to face the front of the driver's face. The lower camera 3 continuously captures an image of the driver's face and transmits the captured image data to the controller 6. The lower camera 3 includes a function of continuously capturing images at a speed of about 30 frames/s, for example.

Figure 4:
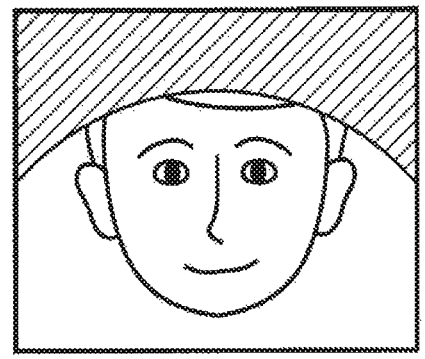
FIG. 4 is a diagram showing an upper camera image.

As shown in FIG. 3, the upper camera 2 captures an image of an area in a range indicated by a solid line and a broken line. The captured upper camera image becomes an image as shown in FIG. 4; the upper part of the driver's face is hidden by the steering wheel 8. The upper camera 2 can capture a good image of the area shown by the solid line, i.e., from the central portion of the driver's face to the lower side, without being hidden by the steering wheel 8.

Figure 5:
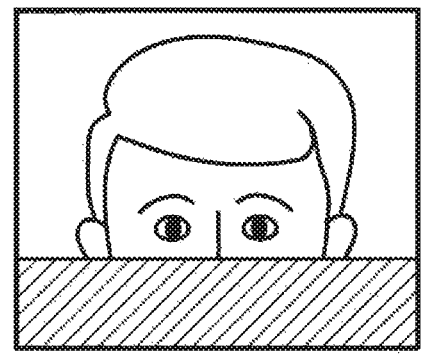
FIG. 5 is a diagram showing a lower camera image.

In contrast, the lower camera 3 captures an image of an area in a range indicated by a solid line and a broken line. The captured lower camera image becomes an image as shown in FIG. 5; the lower part of the driver's face is hidden by the steering column 9. The lower camera 3 can capture a good image of the area indicated by the solid line, i.e., from the central portion of the driver's face to the upper side, without being hidden by the steering column 9.

The tilt position sensor 4 detects the position of the steering wheel 8 when the steering wheel 8 is moved by the tilt mechanism of the steering column 9. A detection signal of the position of the steering wheel 8 is transmitted to the controller 6. The steering angle sensor 5 detects the rotation angle of the steering wheel 8 when the steering wheel 8 is rotated. A detection signal of the rotation angle of the steering wheel 8 is transmitted to the controller 6.

The controller 6, which has a function of controlling the entire vehicular image synthesis apparatus 1, includes an image synthesis processing unit 10 and an image recognition processing unit 11. The image synthesis processing unit 10 includes a boundary detecting unit 12 and a synthesizing unit 13. The image synthesis processing unit 10 receives (i) image data from the upper camera 2 and the lower camera 3, (ii) detection signals from the tilt position sensor 4 and the steering angle sensor 5, and (iii) vehicle information from the vehicle.

Figure 6:
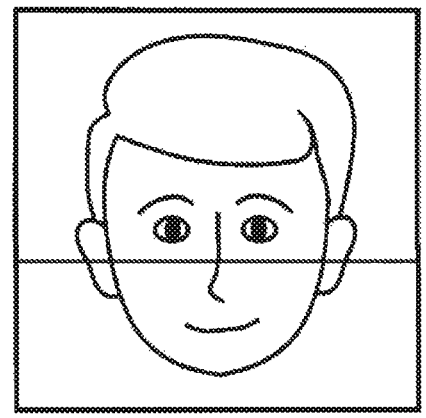
FIG. 6 is a diagram showing a synthetic image.

The boundary detecting unit 12 of the image synthesis processing unit 10 has a function of (i) receiving the upper camera image (see FIG. 4) captured by the upper camera 2 and the lower camera image (see FIG. 5) captured by the lower camera 3, and (ii) detecting a boundary suitable for synthesizing these two images so that a synthetic image includes no portion hidden by the steering wheel 8, the steering column 9, or the like. Then, the synthesizing unit 13 of the image synthesis processing unit 10 has a function of synthesizing the upper camera image and the lower camera image at the detected boundary to create a synthetic image as shown in FIG. 6.

The image recognition processing unit 11 has a function of (i) receiving the synthetic image synthesized by the image synthesis processing unit 10 or a camera image captured by the camera 2, 3 and (ii) performing image recognition processing on the received image (i.e., the face image of the driver). The image recognition processing unit 11 has a function of determining the driver's state, such as dozing or looking aside, and determining whether the driver is in a safe driving state, with the image recognition processing.

Figure 7:
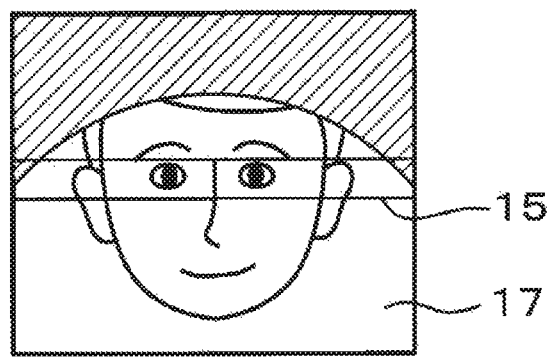
FIG. 7 is a diagram illustrating a row area image of an upper camera image.
Figure 8:
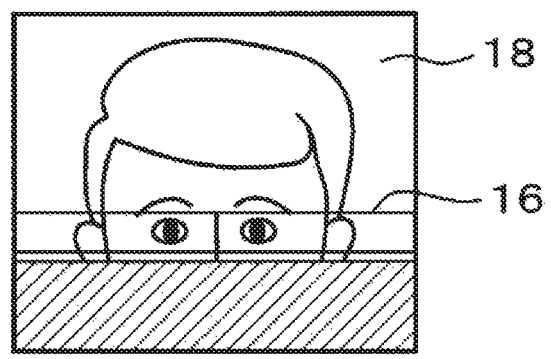
FIG. 8 is a diagram illustrating a row area image of a lower camera image.

Next, the operation of the above configuration, that is, the synthesis control for synthesizing the upper camera image and the lower camera image will be described with reference to FIGS. 7 to 12. First, the outline of this synthesis control will be described. As shown in FIG. 7, the upper camera image is divided into a plurality of row area images 15 row by row in the vertical direction. At the same time, the lower camera image is divided into a plurality of row area images 16 row by row in the vertical direction, as shown in FIG. 8. Then, the row area images 15 obtained by dividing the upper camera image and the row area images 16 obtained by dividing the lower camera image are compared to calculate the similarity degree. The calculation of the similarity degree is configured to be executed for all the row area images 15 of the upper camera image and all the row area images 16 of the lower camera image.

Figure 9:
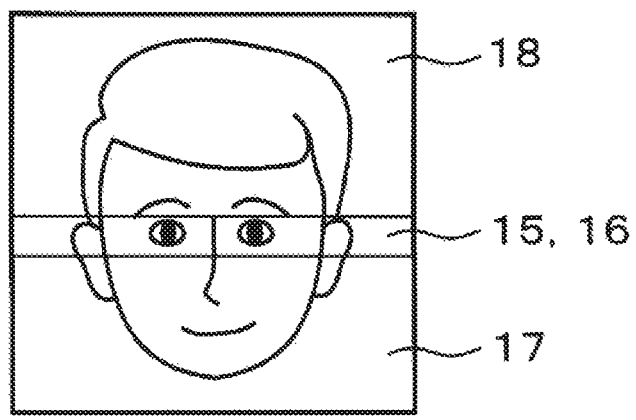
FIG. 9 is a diagram showing a synthetic image synthesized by row area images having the highest similarity degree.

The row area images 15 and 16 having the highest similarity degree are used as a boundary, that is, boundary areas or boundary lines, thereby detecting a boundary. Then, the upper camera image and the upper camera image are synthesized at the boundary. In this case, the image portion 17 below the row area image 15 having the highest similarity degree in the upper camera image, and the image portion 18 above the row area image 16 having the highest similarity degree in the lower camera image are synthesized. As a result, the synthetic image shown in FIG. 9 is created. It is noted either one of the row area images 15 and 16 having the highest similarity degree is adopted for synthesis.

Figure 11:
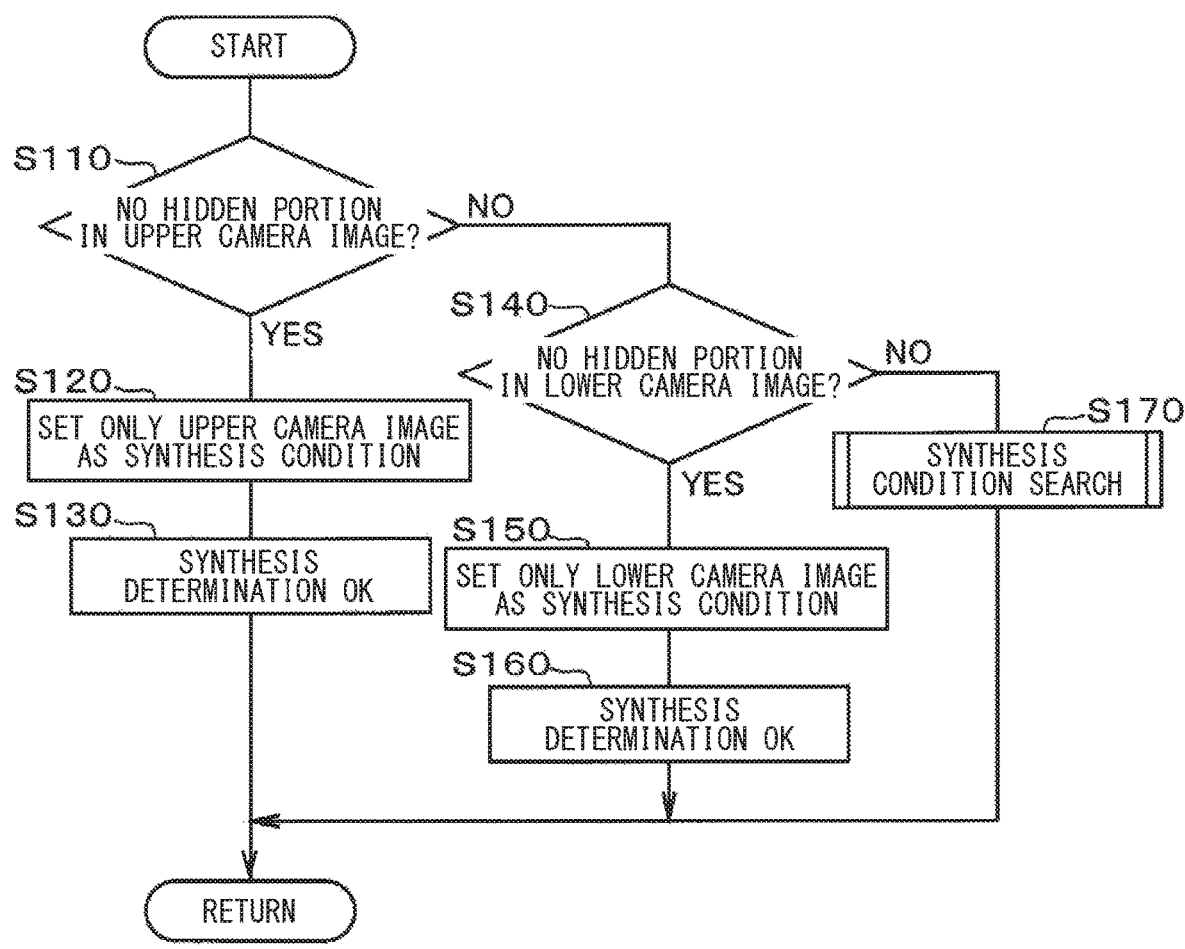
FIG. 11 is a flowchart of a synthesis determination control.
Figure 12:
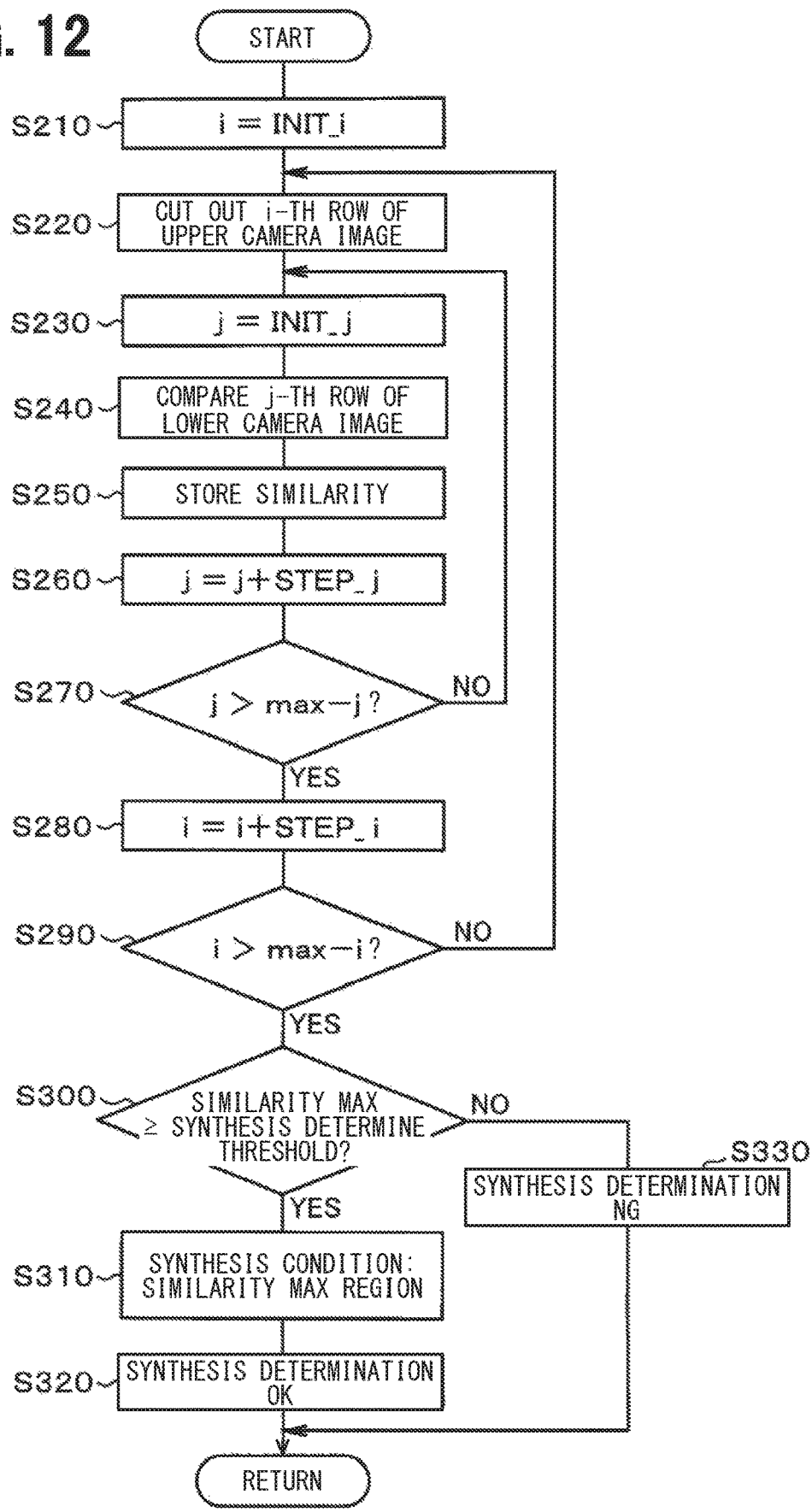
FIG. 12 is a flowchart of a synthesis condition search control.

Next, the specific content of the present synthesis control will be described with reference to the flowcharts of FIGS. 10 to 12. The flowcharts of FIGS. 10 to 12 show the control contents of the controller 6, that is, the image synthesis processing unit 10 and the image recognition processing unit 11.

Figure 10:
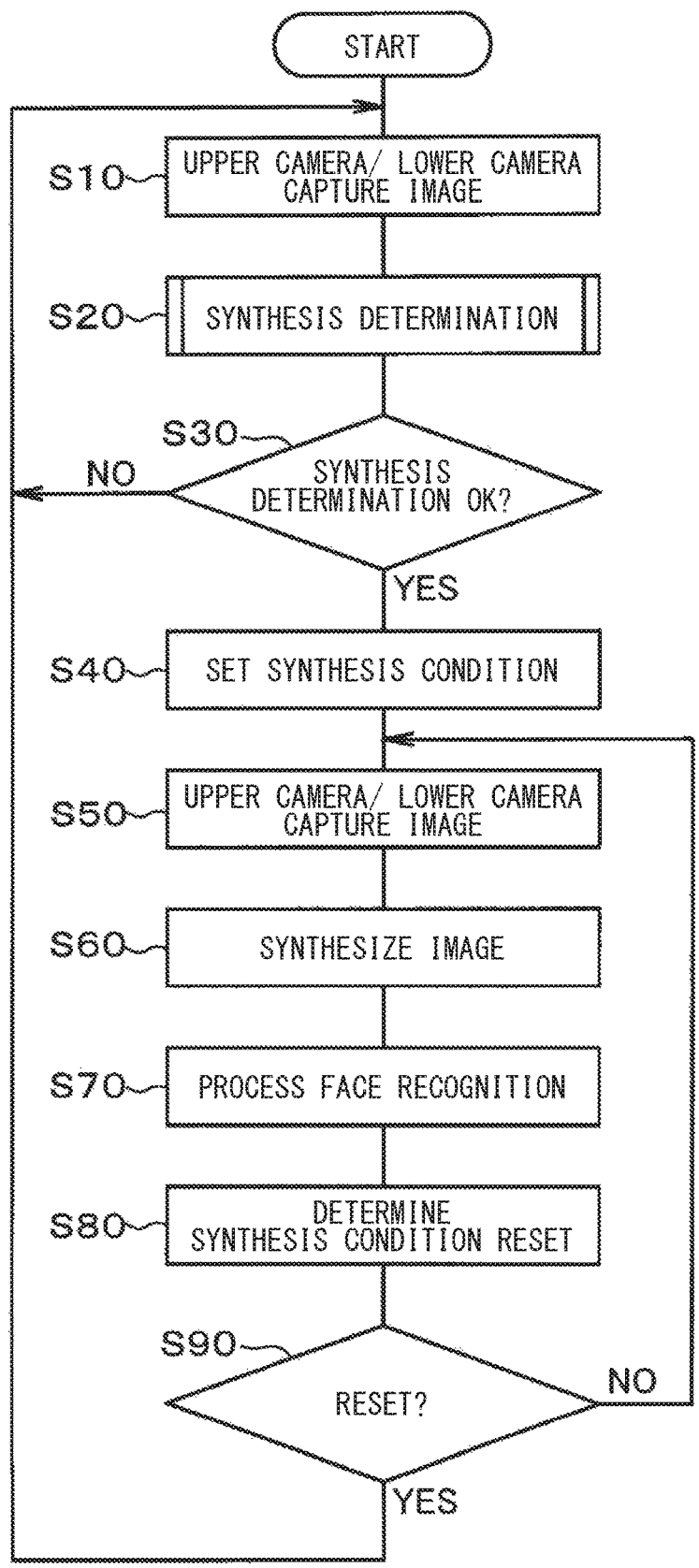
FIG. 10 is a flowchart of an image synthesis control.

First, in step S10 of FIG. 10, the images of the driver's face are captured by the upper camera 2 and the lower camera 3, and the image synthesis processing unit 10 receives the upper camera image and the lower camera image captured by the upper camera 2 and the lower camera 3. Subsequently, the process proceeds to step S20. In step S20, the image synthesis processing unit 10 executes a synthesis determination process of determining whether to synthesize the upper camera image and lower camera image. This synthesis determination process will be described later.

Then, the process proceeds to step S30, where it is determined whether the synthesis determination is OK. Here, when the synthesis determination is not OK (NO), the process returns to step S10. In addition, in step S30, when the synthesis determination is OK (YES), the process proceeds to step S40 to set the image synthesis condition. Specifically, the synthesis condition searched for in the synthesis determination process of step S20 (e.g., the row area images 15 and 16 of the detected boundary region) is set.

Next, in step S50, the images of the driver's face are captured by the upper camera 2 and the lower camera 3, and the image synthesis processing unit 10 receives the upper camera image and the lower camera image captured by the upper camera 2 and the lower camera 3. When the images captured in step S10 are not synthesized, it is preferable to skip image capturing in step S50 once.

Subsequently, the process proceeds to step S60. In step S60, the synthesizing unit 13 of the image synthesis processing unit 10 synthesizes the upper camera image and the lower camera image with the row area images 15 and 16 of the set boundary area as a boundary. As a result, the synthetic image shown in FIG. 9 is created, and the created synthetic image is stored in an internal memory of the controller 6. Then, the process proceeds to step S70. In step S70, the image recognition processing unit 11 executes the image recognition process on the face image of the driver shown in the synthetic image to determine the state of the driver. For this face image recognition processing, it is preferable to use image recognition processing having a well-known configuration.

Next, the process proceeds to step S80. In step S80, a process of determining whether to reset the synthesis condition is executed. Suppose that the steering wheel 8 having moved or rotated is detected by the detection signals from the tilt position sensor 4 and the steering angle sensor 5. In this case, it is determined that resetting is necessary. Further, it is determined that the resetting is necessary even when a predetermined set time has elapsed after the synthesis condition was set.

Subsequently, in step S90, it is determined whether the synthesis condition is reset. Here, when the synthesis condition is not reset (NO), the process returns to step S50. Then the above-described processing, that is, image capture processing by the upper camera 2 and the lower camera 3, the image synthesis processing, and the like are repeatedly executed. Further, in step S90, when the synthesis condition is reset (YES), the process returns to step S10. Then, the above-mentioned processes, that is, the image capturing process by the upper camera 2 and the lower camera 3, the synthesis determination process, the synthesis condition resetting process, and the image synthesis process are repeatedly executed.

Next, the synthesis determination process of step S20 will be described with reference to the flowchart of FIG. 11. First, in step S110 of FIG. 11, it is determined whether the upper camera image has no hidden portion due to the steering wheel 8 or the like. Here, when the upper camera image has no hidden portion (YES), the process proceeds to step S120, where only the upper camera image is set as the synthesis condition. Subsequently, in step S130, the synthesis determination is set to OK. As a result, the control of FIG. 11 is ended. The process returns to the control of FIG. 10, and proceeds to step S30.

In step S110, when the upper camera image has a hidden portion (NO), the process proceeds to step S140. It is then determined whether the lower camera image has no hidden portion due to the steering wheel 8 or the like. Here, when the lower camera image has no hidden portion (YES), the process proceeds to step S150. Then, only the lower camera image is set as the synthesis condition. Subsequently, in step S160, the synthesis determination is set to OK. As a result, the control of FIG. 11 is ended. The process returns to the control of FIG. 10, and proceeds to step S30.

In step S140, when the lower camera image has a hidden portion (NO), the process proceeds to step S170. Then the process of searching for the synthesis condition is executed. This synthesis condition search process will be described later. Then, when the synthesis condition search process is completed, the control of FIG. 11 is ended. The process returns to the control of FIG. 10, and proceeds to step S30.

Next, the synthesis condition search process of step S170 will be described with reference to the flowchart of FIG. 12. The synthesis condition search process is executed by the boundary detecting unit 12 of the image synthesis processing unit 10. Here, an outline of the synthesis condition search process will be described. First, the first row area image of one camera image (e.g., the upper camera image) is cut out, and this row area image is compared with the first row area image of the other camera image (e.g., the lower camera image). Thereby the similarity degree (i.e., the similarity score) is calculated. Then, the comparison and the similarity calculation are all performed from the first row area image to the last row area image of the lower camera image. After that, the next row area image of the upper camera image is cut out, and the similarity degree is calculated for this row area image by comparing all the row area images of the lower camera image. Hereinafter, such comparison and similarity calculation are sequentially executed up to the last row area image of the upper camera image. Then, the row area image having the maximum similarity degree among the calculated similarity degrees is selected as a boundary. The variables and constants in the flowchart of FIG. 12 are defined as follows:

i is a variable of the cut-out row area of the upper camera image;

INIT_i is an initial value of the cutout row area of the upper camera image;

STEP_i is an updated value of the cut-out row area of the upper camera image;

max_i is the end value of the cut-out row area of the upper camera image;

j is a variable of the comparison row area of the lower camera image;

INIT_j is an initial value of the comparison row area of the lower camera image;

STEP_j is an updated value of the comparison row area of the lower camera image; and max_j is the end value of the comparison row area of the lower camera image.

Next, the synthesis condition search process will be specifically described. First, in step S210 of FIG. 12, the initial value INIT_i is input to the variable i of the cutout row area of the upper camera image. Subsequently, in step S220, the i-th row area image of the upper camera image is cut out, that is, read and acquired. Then, in step S230, the initial value INIT_j is input to the variable j in the comparison row area of the lower camera image. Subsequently, the process proceeds to step S240. Then, the i-th row area image of the upper camera image and the j-th row area image of the lower camera image are compared, and the similarity degree is calculated. Next, in step S250, the calculated similarity degree is stored in a memory of the controller 6. In this case, the variable i of the i-row area image of the upper camera image and the variable j of the j-th row area image of the lower camera image are added to the similarity degree and saved.

Subsequently, in step S260, the variable j is updated by the update value STEP_j. Then, the process proceeds to step S270. Then, it is determined whether the variable j has become greater than the end value max_j. Here, when j is not greater than max_j (NO), the process returns to step S240 and the above-described processing is repeatedly executed.

When j becomes greater than max_j in step S270 (YES), the process proceeds to step S280. Then, the variable i is updated by the updated value STEP_i. Then, the process proceeds to step S290. It is determined whether the variable i has become greater than the end value max_i. Here, when i is not greater than max_i (NO), the process returns to step S220. Then the above-described processing is repeatedly executed.

When i becomes greater than max_i in step S290 (YES), the process proceeds to step S300. It is determined whether the calculated maximum value of the similarity degree is equal to or greater than a preset threshold value for synthesis determination. Here, when the maximum value of the similarity degree is equal to or greater than the threshold value for synthesis determination (YES), the process proceeds to step S310. In step S310, the combination of the row area image of the upper camera image and the row area image of the lower camera image having the maximum value of the similarity degree is selected and set as the boundary area of the synthesis condition. Then, the process proceeds to step S320, and the synthesis determination is set to OK. As a result, this control is ended. The process returns to the control of FIG. 11 and then the control of FIG. 10.

In step S300, when the maximum value of the similarity degree is not greater than or equal to the threshold value for synthesis determination (NO), the process proceeds to step S330, where the synthesis determination is set to NG. As a result, the present control is ended. The process returns to the control of FIG. 11 and then to the control of FIG. 10 to capture images again, and performs the synthesis determination again.

In the present embodiment having such a configuration, the two camera images captured by the cameras 2 and 3 are compared to detect a boundary suitable for synthesis, that is, the row area images 15 and 16 having the highest similarity degree. The two camera images are synthesized at the row area images 15 and 16 having the highest similarity degree. According to this configuration, two images captured by two cameras can be synthesized into one image well. Therefore, when the image of the driver's face is captured by the cameras 2 and 3, it is possible to obtain an image in which the driver's face is well photographed, that is, a good synthetic image.

Further, in the above-described embodiment, the row area images 15 are obtained by dividing the upper camera image captured by the upper camera 2 into a plurality of row areas and the row area images 16 are obtained by dividing the lower camera image captured by the lower camera 3 into a plurality of row areas. The similarity degrees are calculated between the row area images 15 and the row area images 16. The row area images having the highest similarity degree are detected as the boundary. With this configuration, it is possible to easily and surely detect the boundary for image synthesis with a simple configuration.

Further, in the above-described embodiment, the driver who has no hidden portion is shown in the upper camera image or the lower camera image. In this case, a camera image showing a driver with no hidden portions is used. As a result, the image is not synthesized. According to this configuration, since the images are not synthesized, the time required for the entire image recognition process can be shortened as compared with the case of synthesizing the images.

Further, in the above-described embodiment, when the steering wheel is moved by the tilt mechanism, or when the set time has elapsed after the image synthesis process or the image recognition process is executed, the process of detecting the boundary by the boundary detecting unit is performed again. According to this configuration, the process of detecting the boundary of the image synthesis is executed only at the minimum necessary amount and is not executed every time the image synthesis process is performed. That is, the boundary condition is fixed during the image synthesis process for about the set time. Therefore, when a large number of synthetic images are synthesized, the time required for the synthesis can be greatly reduced.

In the above embodiment, the range of similarity calculation in the upper camera image or the lower camera image, that is, INIT_i, max_i, INIT_j, max_j may be changed (i) according to the position or angle of the steering wheel 8. Alternatively, the updated values STEP_i and STEP_j of the row area image may be changed appropriately. With this configuration, the image to be calculated becomes small, and the amount of calculation can be reduced, so that the processing load on the controller 6 can be reduced.

Second Embodiment

Figure 13:
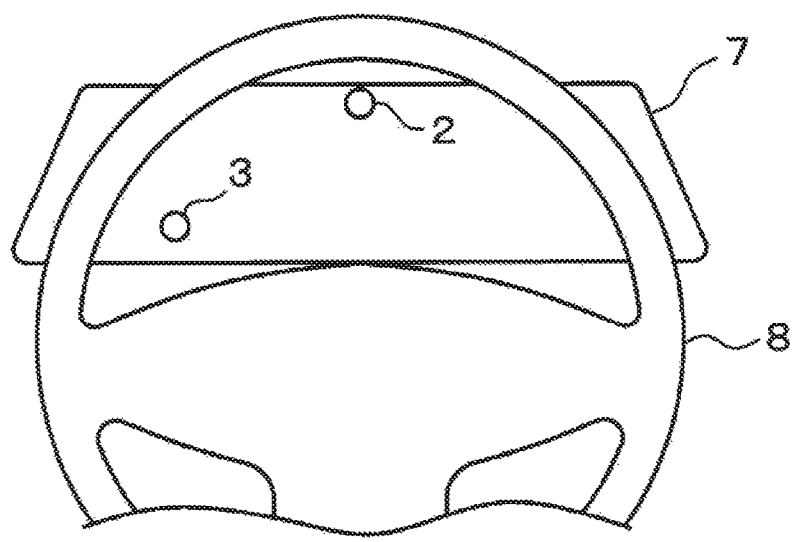
FIG. 13 is a diagram showing a steering wheel, a meter, and a camera according to a second embodiment.
Figure 14:
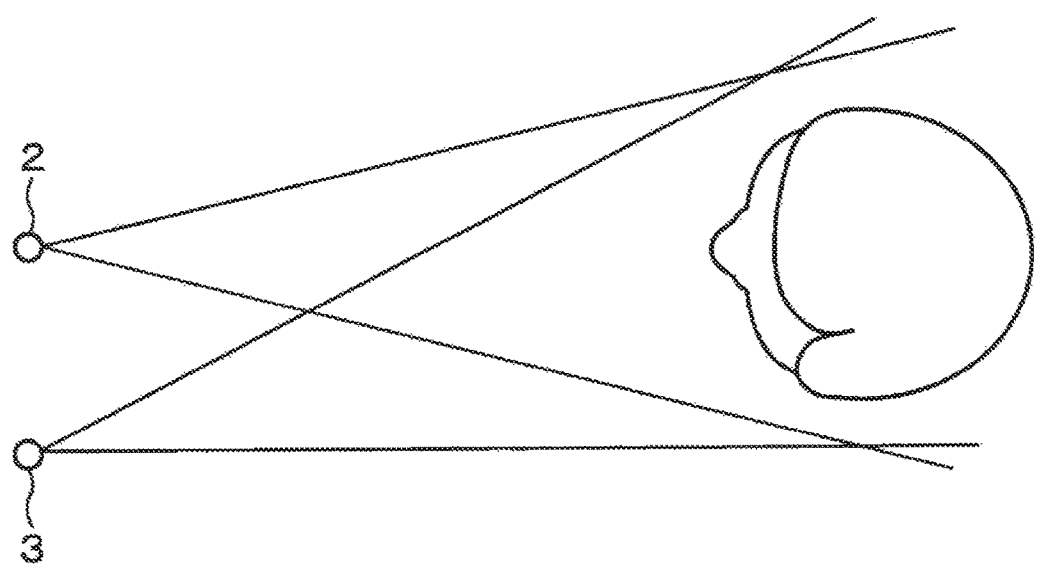
FIG. 14 is a top view showing a camera, and a driver.

FIGS. 13 to 18 show a second embodiment. A configuration identical to that according to the first embodiment is denoted by an identical reference sign. In the second embodiment, as shown in FIGS. 13 and 14, two cameras 2 and 3 are arranged so as to be displaced in the horizontal direction. Specifically, the lower camera 3 is arranged at a position horizontally away from a position of the upper camera 2 by a predetermined distance. The upper camera 2 is arranged so as to face the front of the driver's face. This configuration is to generate an image in which the lower camera image is rotationally moved so as to eliminate the displacement, and then to synthesize the two images. The image synthesis processing unit 10 of the controller 6 has a function as an image generating unit.

Figure 15:
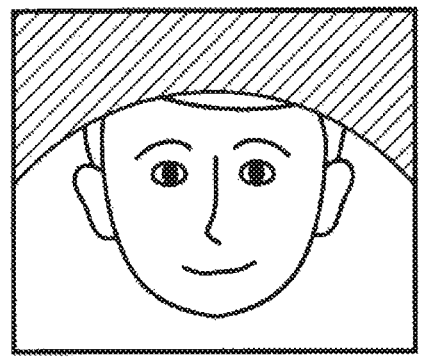
FIG. 15 is a diagram showing an upper camera image.
Figure 16:
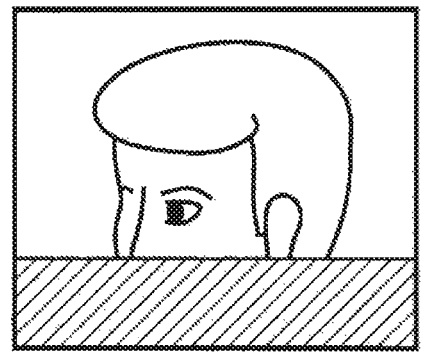
FIG. 16 is a diagram showing a lower camera image.

In the second embodiment, the upper camera image captured by the upper camera 2 is an image as shown in FIG. 15. Then, the lower camera image captured by the lower camera 3 becomes an image as shown in FIG. 16. The driver's face in the upper camera image is facing the front, while the driver's face in the lower camera image is facing slightly diagonally. When both images are synthesized, an unnatural face will result.

Figure 17:
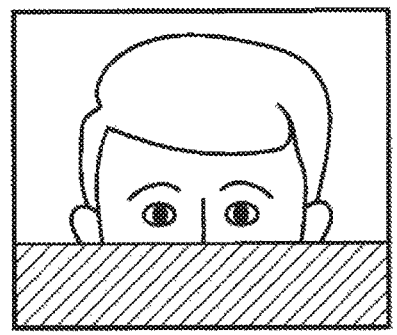
FIG. 17 is a diagram showing an image obtained by rotating and moving a lower camera image.
Figure 18:
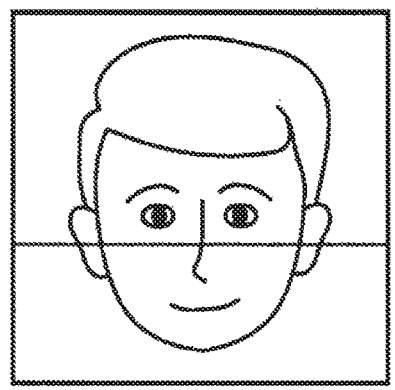
FIG. 18 is a diagram showing a synthetic image.

Therefore, in the second embodiment, the controller 6 rotationally moves the lower camera image by performing, for example, affine transformation. A rotational movement image as shown in FIG. 17 is created, and this rotational movement image is stored in the memory. Then, the controller 6 is configured to synthesize the rotational movement image of the lower camera image and the upper camera image using the image synthesis control of the first embodiment. As a result, a good synthetic image as shown in FIG. 18 can be obtained.

The configuration according to the second embodiment other than those described above are similar to the corresponding configuration according to the first embodiment. The second embodiment thus achieves substantially the same functional effect as that according to the first embodiment. In particular, according to the second embodiment, when the two cameras 2 and 3 are arranged so as to be displaced in the horizontal direction, an image is generated by rotating the camera image so as to eliminate the displacement, and then two images are synthesized. Therefore, a good synthetic image can be synthesized.

Third Embodiment

Figure 19:
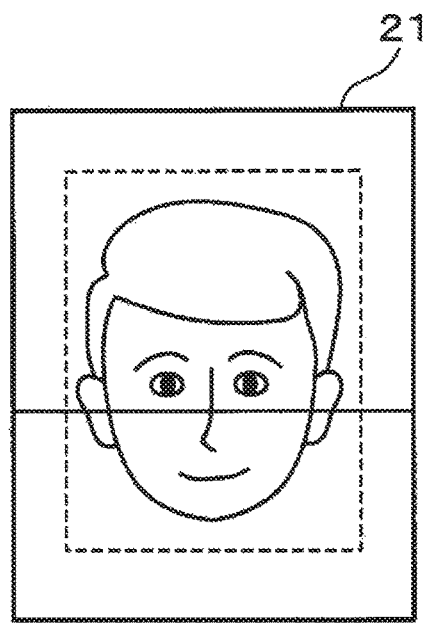
FIG. 19 is a diagram showing a synthetic image according to a third embodiment.

FIG. 19 shows a third embodiment. A configuration identical to that according to the first embodiment is denoted by an identical reference sign. In the third embodiment, the size of the image data used for image synthesis and image recognition processing is reduced, as indicated by the broken-line rectangular area in FIG. 19. In this configuration, the image synthesis processing unit 10 of the controller 6 has a function as an image reducing unit.

Specifically, first, using the image synthesis control of the first embodiment, the upper camera image and the lower camera image are synthesized to create a synthetic image 21 as shown in FIG. 19. The size and position of the face image are detected by performing image recognition processing of the driver's face on the synthetic image 21. Then, based on the information on the size and position of the detected face image, the size of the image required for the image synthesis and the image recognition processing is set as shown by the broken-line rectangular area in FIG. 19, which is made smaller than the synthetic image 21.

After that, when the upper camera image and the lower camera image are synthesized, each of the upper camera image and the lower camera image uses a partial image corresponding to the portion indicated by the broken-line rectangular area or a size slightly greater than this partial image. Then, almost the same synthesis process as the image synthesis control of the first embodiment is executed. Then, even when the image recognition processing is performed on the synthetic image, the image recognition processing is performed using the portion indicated by the broken-line rectangular area.

The configuration according to the third embodiment other than those described above is similar to the corresponding configuration according to the first embodiment. The third embodiment thus achieves substantially the same functional effect as that according to the first embodiment. In particular, according to the third embodiment, since the image data used for image synthesis and image recognition processing is configured to be small, the processing load on the controller 6 can be reduced.

Fourth Embodiment

Figure 20:
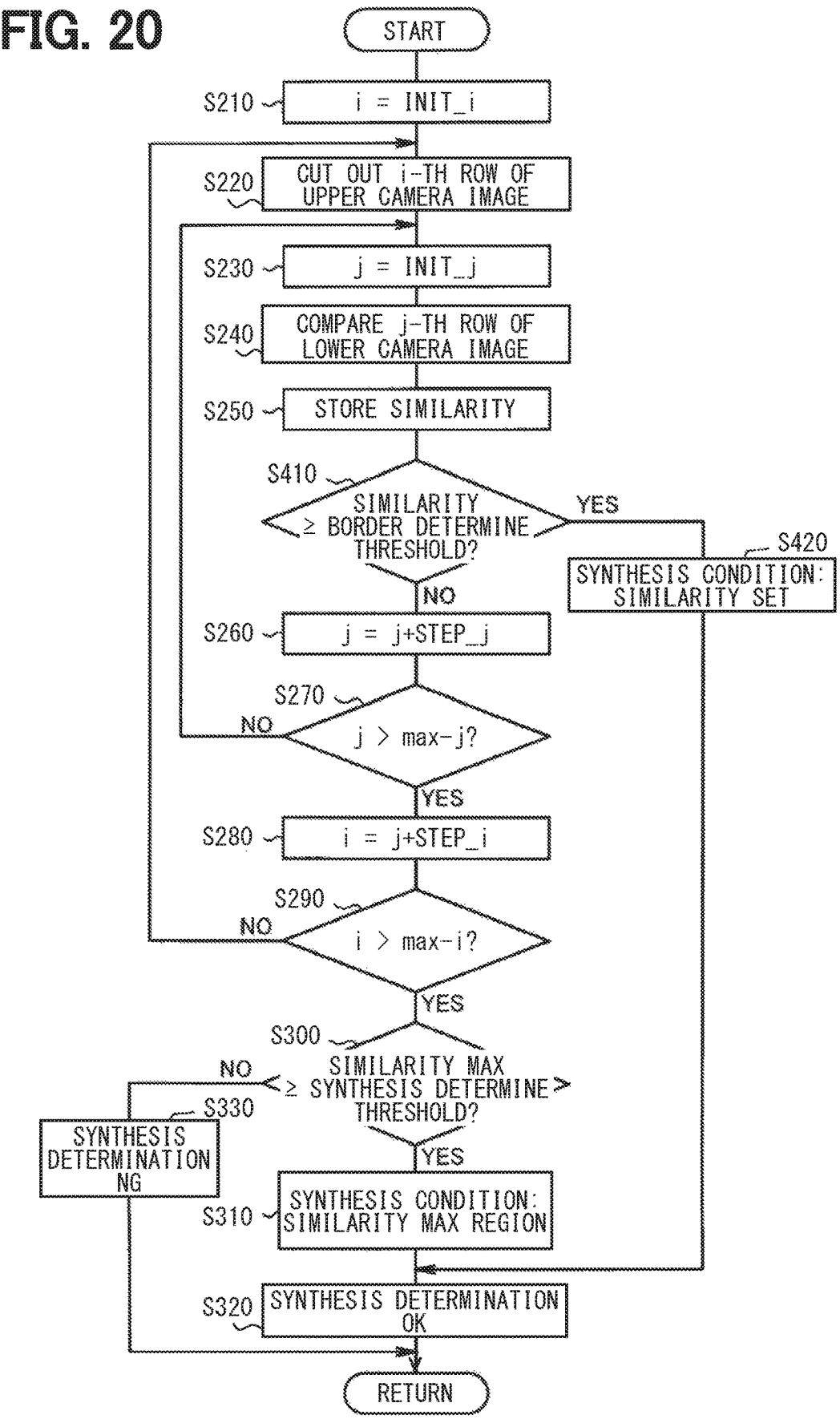
FIG. 20 is a flowchart of a synthesis condition search control according to a fourth embodiment.

FIG. 20 shows a fourth embodiment. A configuration identical to that according to the first embodiment is denoted by an identical reference sign. In the fourth embodiment, when calculating the similarity degree between the row area image of the upper camera image and the row area image of the lower camera image, the similarity degree may be equal to or greater than a preset threshold for boundary determination. In this case, the calculation of the similarity degree is stopped, and the row area image having the similarity degree equal to or greater than the threshold for boundary determination is detected as the boundary.

Specifically, steps S210 to S250 of FIG. 20 are executed similarly to the first embodiment, and after step S250, the process proceeds to step S410. In step S410, it is determined whether the calculated similarity degree is equal to or greater than the threshold for boundary determination. Here, when the similarity degree is not equal to or greater than the threshold value for boundary determination (NO), the process proceeds to step S260. Thereafter, the processes up to step S330 are performed similarly to the first embodiment.

Further, in step S410, when the similarity degree is equal to or greater than the threshold for boundary determination (YES), the process proceeds to step S420. As the boundary area of the synthesis condition, the combination of the row area image of the upper camera image and the row area image of the lower camera image having a similarity degree equal to or greater than the threshold for boundary determination is selected and set. Then, the process proceeds to step S320, the synthesis determination is set to OK, and the present control ends.

The configuration according to the fourth embodiment other than those described above is similar to the corresponding configuration according to the first embodiment. The fourth embodiment thus achieves substantially the same functional effect as that according to the first embodiment. In particular, according to the fourth embodiment, when the similarity degree becomes equal to or greater than the threshold for boundary determination during the calculation of the similarity degree, calculation of the similarity degree is stopped. The row area images whose similarity degree exceeds the threshold for boundary determination are detected as a boundary. Therefore, it is possible to reduce the time required for the boundary detecting process, and thus the time required for image synthesis.

In each of the above embodiments, the row area image of the upper camera image and the row area image of the lower camera image are compared to calculate the similarity degree. However, the configuration is not limited to this, and the column region images may be compared instead of the row area images. The column area images are obtained by dividing the camera image laterally into a plurality of columns. Further, the upper camera image and the lower camera image may be divided into a plurality of rectangular image areas of a predetermined size, and the divided rectangular image areas may be compared.

Further, in each of the above-described embodiments, the present disclosure is applied to the configuration in which the two cameras 2 and 3 are arranged, but the present disclosure is not limited to this. It may be applied to a configuration in which three or more cameras are provided and three or more camera images captured by the three or more cameras are synthesized.

Further, in each of the above embodiments, the similarity degree is calculated, and the row area images 15 and 16 having the highest similarity degree are used as a boundary. However, it is not limited to this. The image areas of the upper camera image and the lower camera image may be narrowed for calculating the degree of similarity for detecting the boundary using the various information. The various information may include the information of the face recognition result of the image recognition processing unit 11, steering wheel tilt position, steering angle, and vehicle parameters included in vehicle information. The vehicle parameters may include camera installation conditions, steering shape, and driver position. With such a configuration, the boundary detecting time and the processing load on the controller 6 can be reduced.

Further, the calculation of the similarity degree may be not adopted.

Alternatively, a boundary suitable for synthesis (i.e., the row area image as a boundary suitable for synthesis) may be detected and set by the calculation based on the tilt position of the steering wheel, the steering angle, and the vehicle parameter. With this configuration, since the similarity degree is not calculated, the time required to detect the boundary can be significantly reduced.

Further, it is noted that the controller 6 and methods performed by the controller 6 described in the above embodiments may be implemented by one or more special-purpose computers. Such a computer may be created (i) by configuring (a) a memory and a processor programmed to execute one or more particular functions embodied in computer programs, or (ii) by configuring (b) a processor provided by one or more dedicated hardware logic circuits, or (iii) by configuring a combination of (a) a memory and a processor programmed to execute one or more particular functions embodied in computer programs and (b) a processor provided by one or more dedicated hardware logic circuits. The computer programs may be stored, as instructions being executed by a computer, in a tangible non-transitory computer-readable storage medium.

Although the present disclosure has been described in accordance with the embodiments, it is understood that the present disclosure is not limited to such embodiments or structures. The present disclosure covers various modifications and equivalent arrangements. In addition, various combinations and forms, and further, other combinations and forms including only one element, or more or less than these elements are also within the scope and the spirit of the present disclosure.

For reference to further explain features of the present disclosure, the description is added as follows.

There is a device in which (i) a face image of a driver is captured by a camera while a driver is driving a vehicle, (ii) the driver's state such as dozing or looking aside is detected based on the captured face image, and (iii) an alarm is issued when it is determined that the driver cannot drive safely. Since the driver visually recognizes the meter on the instrument panel of the vehicle during driving, the camera for capturing the driver's face is installed near the meter of the vehicle. There is provided a steering wheel between the meter and the driver. Especially in vehicles where the tilt mechanism can move the position of the steering wheel, the steering wheel may hide the driver's face. Therefore, there is a possibility that the driver's face cannot be captured well by the camera.

It is thus desired to provide a vehicular image synthesis apparatus for a vehicle that can obtain an image of a driver's face in a good condition when the driver's face is captured by a camera.

An aspect of the present disclosure described herein is set forth in the following clauses.

According to an aspect of the present disclosure, a vehicular image synthesis apparatus may be provided to include a plurality of cameras mounted on a vehicle for respectively capturing images of a driver, a boundary detecting unit, and a synthesizing unit. The boundary detecting unit may be configured to compare a plurality of images captured by the plurality of cameras to detect a boundary suitable for synthesis. The synthesizing unit may be configured to synthesize the plurality of images at the boundary.

What is claimed is:

1. A vehicular image synthesis apparatus for a vehicle, comprising:
a plurality of cameras mounted on the vehicle, the plurality of cameras being configured to respectively capture images of a driver from mutually different positions; and
a controller connected with the plurality of cameras, the controller being configured
to compare a plurality of images captured by the plurality of cameras to detect a boundary suitable for synthesis, and
to synthesize the plurality of images at the boundary to enable the image of the driver to include no hidden portion, wherein
the plurality of cameras include a first camera configured to capture a first image and a second camera configured to capture a second image;
the controller is further configured to
to calculate similarity degrees between (i) row area images obtained by dividing the first image captured by the first camera into a plurality of row areas and (ii) row area images obtained by dividing the second image captured by the second camera into a plurality of row areas,
to detect the row area images with the similarity degree exceeding the preset threshold as the boundary; and
in response to calculating the similarity degrees between the row area images of the first image and the row area images of the second image upon determining that the similarity degree exceeds a preset threshold for boundary determination, the controller is further configured to stop calculating the similarity degrees and to detect the row area images with the similarity degree exceeding the preset threshold as the boundary.

2. A vehicular image synthesis apparatus for a vehicle, comprising:
a plurality of cameras mounted on the vehicle, the plurality of cameras being configured to respectively capture images of a driver from mutually different positions; and
a controller connected with the plurality of cameras, the controller being configured
to compare a plurality of images captured by the plurality of cameras to detect a boundary suitable for synthesis, and
to synthesize the plurality of images at the boundary to enable the image of the driver to include no hidden portion, wherein
the plurality of cameras include a first camera configured to capture a first image and a second camera configured to capture a second image;
the controller is further configured to
to calculate similarity degrees between (i) row area images obtained by dividing the first image captured by the first camera into a plurality of row areas and (ii) row area images obtained by dividing the second image captured by the second camera into a plurality of row areas,
to detect the row area images with the similarity degree exceeding the preset threshold as the boundary, and
to generate an image obtained by rotationally moving the first image or the second image so as to eliminate a displacement in response to the first camera and the second camera being arranged so as to be displaced in a horizontal direction or a vertical direction; and
the generated image obtained by rotationally moving the first image or the second image is used by the controller to perform image synthesis.

3. A vehicular image synthesis apparatus for a vehicle, comprising:
a plurality of cameras mounted on the vehicle, the plurality of cameras being configured to respectively capture images of a driver from mutually different positions; and
a controller connected with the plurality of cameras, the controller being configured
to compare a plurality of images captured by the plurality of cameras to detect a boundary suitable for synthesis, and
to synthesize the plurality of images at the boundary to enable the image of the driver to include no hidden portion, wherein
the plurality of cameras include a first camera configured to capture a first image and a second camera configured to capture a second image;
the controller is further configured to
to calculate similarity degrees between (i) row area images obtained by dividing the first image captured by the first camera into a plurality of row areas and (ii) row area images obtained by dividing the second image captured by the second camera into a plurality of row areas,
to detect the row area images with the similarity degree exceeding the preset threshold as the boundary, and
to reduce an image in response to determining that the image is enabled to be reduced based on an image recognition result; and
the reduced image is used by the controller to perform image synthesis.

4. A vehicular image synthesis apparatus for a vehicle, comprising:
a plurality of cameras mounted on the vehicle, the plurality of cameras being configured to respectively capture images of a driver from mutually different positions; and
a controller connected with the plurality of cameras, the controller being configured
to compare a plurality of images captured by the plurality of cameras to detect a boundary suitable for synthesis, and
to synthesize the plurality of images at the boundary to enable the image of the driver to include no hidden portion, wherein
the plurality of cameras include a first camera configured to capture a first image and a second camera configured to capture a second image;
the controller is further configured to
to calculate similarity degrees between (i) row area images obtained by dividing the first image captured by the first camera into a plurality of row areas and (ii) row area images obtained by dividing the second image captured by the second camera into a plurality of row areas, and
to detect the row area images with the similarity degree exceeding the preset threshold as the boundary; and
in response to the image of the driver shown in the first image or the second image including no hidden portion, the controller is further configured to use the first image or the second image showing the image of the driver including no hidden portion and to not perform image synthesis.

* * * * *